(12) United States Patent  
Schneider et al.

(10) Patent No.: US 8,307,813 B2
(45) Date of Patent: Nov. 13, 2012

(54) HEATING DEVICE FOR LIQUID FUELS AND THE LIKE

(75) Inventors: Jens Schneider, Leonberg (DE); Jean-Marc Couffignal, Auzits (FR); Stephan Ernst, Bad Herrenalb (DE)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 12/678,688

(22) PCT Filed: Sep. 17, 2008

(86) PCT No.: PCT/EP2008/062367
§ 371 (c)(1), (2), (4) Date: Mar. 17, 2010

(87) PCT Pub. No.: WO2009/053174
PCT Pub. Date: Apr. 30, 2009

(65) Prior Publication Data
US 2010/0206268 A1    Aug. 19, 2010

(30) Foreign Application Priority Data
Oct. 18, 2007   (DE) .......................... 10 2007 049 973

(51) Int. Cl.
*F23Q 7/06* (2006.01)
*F23Q 7/00* (2006.01)

(52) U.S. Cl. .................................... 123/552; 123/143 R

(58) Field of Classification Search .................. 123/543, 123/549, 552, 557, 558, 143 R, 145 A; 239/135; 137/334, 336; 261/152; 219/538
See application file for complete search history.

(56) References Cited

U.S. PATENT DOCUMENTS

| | | | | | |
|---|---|---|---|---|---|
| 4,485,778 | A | * | 12/1984 | Oliver | 123/254 |
| 5,050,569 | A | * | 9/1991 | Beunk et al. | 123/549 |
| 5,361,990 | A | * | 11/1994 | Pimentel | 239/133 |
| 5,758,826 | A | * | 6/1998 | Nines | 239/136 |
| 5,834,736 | A | * | 11/1998 | Kawamura | 219/270 |
| 2008/0060621 | A1 | * | 3/2008 | Trapasso et al. | 123/557 |

FOREIGN PATENT DOCUMENTS

| | | |
|---|---|---|
| DE | 40 05 455 | 8/1990 |
| DE | 200 21 203 | 5/2001 |
| DE | 201 21 116 | 4/2003 |
| EP | 0 068 688 | 1/1983 |
| EP | 1 036 930 | 9/2000 |
| EP | 1 657 425 | 5/2006 |
| JP | 58-2463 | 1/1983 |
| JP | 10300083 | * 11/1998 |
| JP | 2001-135794 | 2/2001 |
| JP | 2008-539354 | 11/2008 |
| WO | 95/08395 | 3/1995 |
| WO | 2006/130938 | 12/2006 |

* cited by examiner

*Primary Examiner* — Mahmoud Gimie
(74) *Attorney, Agent, or Firm* — Kenyon & Kenyon LLP

(57) ABSTRACT

A heating device, which is designed as a heater for liquid fuels, has a housing component and a heating element embedded in the housing component. The heating element is designed as a self-regulating heating element, so that protection against overheating is ensured.

7 Claims, 5 Drawing Sheets

HEATING DEVICE FOR LIQUID FUELS AND THE LIKE

FIELD OF THE INVENTION

The present invention relates to a heating system. More specifically, the present invention relates to a heater for liquid fuels, which is able to be integrated into a component of a fuel-injection system. Among other things, the heating device is suitable for a fuel injector of air-compressing, self-igniting internal combustion engines.

BACKGROUND INFORMATION

A fuel injector for an internal combustion engine is discussed in German patent document DE 40 05 455 A1. There, a piezoelectric actuating element for a valve needle is provided. Furthermore, a chamber filled with fuel is provided, which is sealed via a spring diaphragm, which simultaneously operates as restoring spring for the valve needle.

In the fuel injector of DE 40 05 455 A1 the fuel is spray-discharged from the fuel-filled chamber when the valve needle is actuated. However, when such a known fuel injector is used in a fuel-injection system, the problem arises that, in particular, a starting behavior of an engine is disadvantageous. This problem occurs especially when a mixture of gasoline and alcohol, a diesel fuel or a mixture of diesel and organic fuels is used as fuel.

SUMMARY OF THE INVENTION

In contrast, the heating device according to the present invention having the features described herein, the fuel injector according to the present invention having the features further described herein, and the component of a fuel-injection system according to the present invention having the features further described herein have the advantage of ensuring an advantageous heat source with reliable protection against overheating. In particular when heating liquid fuels, a reliable protection against overheating can be ensured since the surface temperature of the heating element is able to be restricted in order not to exceed the ignition temperature of a fuel, especially a fuel mixture.

The measures mentioned in the dependent claims permit advantageous further developments of the heating device described herein, the fuel injector further described herein, and the component of a fuel-injection system further described herein.

It is advantageous that the self-regulating heating element has a posistor. Such a posistor is formed by a PTC resistor, which has a positive temperature coefficient in the operating range. A reliable and rapidly responding overheating protection is provided by a self-regulating heating element. When preheating fuel such as a mixture of ethanol and gasoline, for example, a restriction of the surface temperature of the heater to approximately 200° C. is advantageous in order not to reach an ignition temperature of the fuel. Such a situation may occur, for example, if the fuel supply is interrupted and the fluid level in the region of the heating elements drops, so that a mixture of fuel and air at least partially forms in the region of the surface of the heating element.

An outer surface of the self-regulating heating element is advantageously in direct contact with a liquid fuel, thereby ensuring a satisfactory heat transfer. It is advantageous that the self-regulating heating element is made from a fuel-resistant material. The self-regulating heating element may also consist of a plurality of materials, an outer region being formed by a fuel-resistant material, and a core region of the self-regulating heating element being made from some other material, for example.

It is also advantageous that an outer surface of the self-regulating heating element is at least partially coated with a protective layer. The protective layer may also be restricted to a portion of the outer surface that is susceptible to the action of fuel. The protective layer makes it possible to obtain higher resistance to the surrounding media, in particular diesel fuel containing fuel or water.

Furthermore, it is advantageous that the protective layer has solid pigment particles which improve the thermal conductivity of the protective layer. The solid pigments may essentially be formed by boron nitride, graphite and/or silicon carbide.

It is also advantageous that the self-regulating heating element is enclosed by the housing component. In this case it is also advantageous that the housing component is made from a heat-conductive plastic or composite. In addition, the housing component may be designed to be impact-resistant and temperature-resistant, so that protection of the heating element from chemical and mechanical damage is ensured. This also facilitates the handling of the heating element. In particular, damage during transport or installation is prevented.

Furthermore, the housing component may also be made up of a plurality of plastic components, in particular two plastic components. In this context it is advantageous that the second plastic component, which surrounds a heating region of the heating element, is made from a heat-conducting, fuel-resistant material, which, for instance, includes the heat-conducting filler materials in order to achieve satisfactory thermal conduction and thus a relatively rapid response behavior with regard to an overheating protection. Such a filler material may be formed by a metal powder, graphite, silicon carbide and/or boron nitride.

The geometry of the heating element may advantageously be adapted to the individual application case. More specifically, the heating region may be in the shape of a pin, disk, perforated disk, ring or key. For one, this makes it possible to specify the output heat quantity within certain limits via the created surface. For another, if liquid media, in particular fuel, are heated, an adaptation to the available space and the flow rate of the fuel is possible.

Exemplary embodiments of the present invention are explained in greater detail in the following description with reference to the attached drawing, in which identical elements have been provided with matching reference numerals.

DETAILED DESCRIPTION

Figure 1:
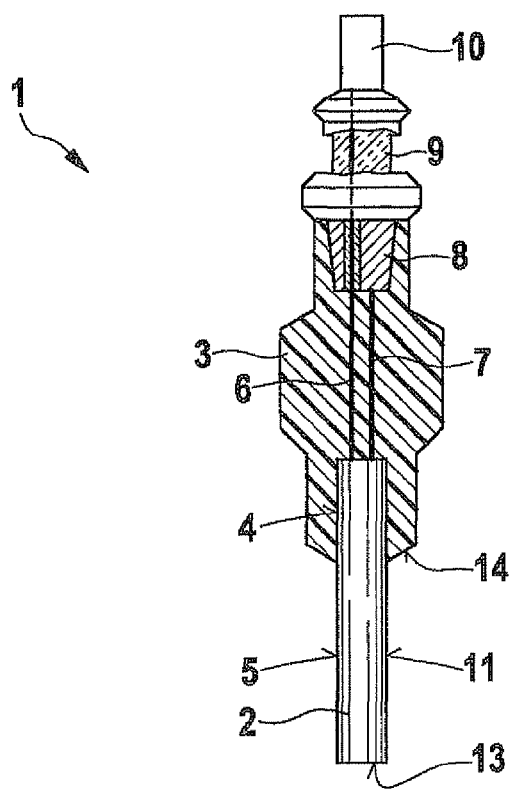
FIG. 1 shows a heating device according to a first exemplary embodiment of the present invention, in a schematic sectional view.

FIG. 1 shows a heating device 1 having a self-regulating heating element 2 according to a first exemplary embodiment of the present invention. Heating device 1 may be designed as heater for liquid fuels, in particular. The heating device is especially suitable for fuel-injection systems of mixture-compressing, externally ignited internal combustion engines or for air-compressing, self-igniting internal combustion engines, gasoline, diesel, a mixture of gasoline or diesel with other fuels, or the like being used. Alcohols, especially methanol or ethanol, or biological fuels, especially oils such as rapeseed oil, also may be used as fuel.

However, heating device 1 of the present invention is suitable for other applications as well.

Heating device 1 has a housing component 3, in which self-regulating heating element 2 is partially embedded. A contacting region 4 of heating element 2 is at least essentially surrounded by housing component 3, while a heating region 5 of heating element 2 is at least essentially freely exposed in order to permit direct contact with a fluid medium, in particular liquid fuel. In contacting region 4, heating element 2 is contacted by two electric lines 6, 7, which are routed through housing component 3, which thereby seals them from the environment. Electric line 7 connects heating element 2 to a metal contact element 8, which forms a negative contact, for example. On one side electric line 6 is connected to heating element 2. Furthermore, electric line 6 is routed through contact element 8 and an insulation element 9, electric line 6 being electrically insulated from contact element 8. A circular plug 10 is provided in addition, which is insulated from contact element 8 with the aid of insulation element 9 and connected to electric line 6. By applying an electric voltage to circular plug 10 relative to contact element 8 connected to ground, a selected voltage is able to be applied to self-regulating heating element 2 in order to achieve heating of heating element 2 at least in heating region 5.

In heating device 1 shown in FIG. 1, an outer surface 11 of self-regulating heating element 2 lies freely exposed in heating region 5, so that it is used for direct heating of a fuel. The heating element is essentially designed in the form of a pin or digit. Heating element 2 may be designed in such a way that a projection length of 20 mm to 50 mm of heating region 5 and a diameter of the heating element of 3.5 mm to 5.5 mm is provided. However, other dimensions may be selected as well. In particular in the case of a heating element 2 in which a possible heating temperature is restricted to 200° C. or so, individual components of heating device 1 may be produced from a temperature-stable plastic or composite material, without damage to these components being caused by the heat. Housing component 3 may be made of temperature-resistant plastic or composite material, for example. It is preferred if plastics that have sufficient resistance to the medium to be heated, in particular fuel, are used for this purpose.

Furthermore, for heating device 1 shown in FIG. 1, in which heating element 2 is in direct contact with the fuel in heating region 5, heating element 2 is made from a material that is sufficiently resistant against the fuel, taking the potential temperature range into account. This also applies to the resistance to organic acids and the like, which may develop from the fuel or the fuel mixture, as well as with respect to aqueous solutions containing halogenide. However, the material may also be optimized for the specific application and thus the individual medium that is in contact with heating element 2.

In order to ensure rapid and effective heating of the surrounding medium, a high heat output via a relatively small surface will usually be required. A typically required heat output lies at approximately 150 W to 250 W. Especially in the case of a housing component 3 that partially encloses heating region 5 as well, an excellent heat transfer through housing component 3 is advantageous.

Since the heating element shown in FIG. 1 is in direct contact with a flammable fuel, a reliable and rapidly responding overheating protection will be necessary. At no time should an outer surface 11 of heating element 2 exceed the ignition temperature of the fuel. Typically, the heat dissipation of heating element 2 in fluids is approximately four to six times higher than in air. When the fluid level drops, e.g., when the fuel supply is interrupted, overheating may therefore occur even after a very short time. The danger thereby exists that the fuel-air mixture ignites or explodes. Accordingly, a rapidly responding overheating protection, which limits the surface temperature of heating element 2 at outer surface 11, e.g., to less than 200°, is important. This prevents that the ignition temperature of the fuel mixture is reached. For example, depending on the composition, the ignition temperature of gasoline lies within a range of approximately 200° C. through 280°. The ignition temperature of methanol, ethanol or mixtures lies in a range from approximately 400° C. to 430° C. If required, an optimization with regard to the particular application case in terms of the selected heating element 2 may take place in order to ensure high heat dissipation on the one hand, and reliable overheating protection on the other.

Housing component 3 accommodates heating element 2 and constitutes the outer form of heating device 1. Housing component 3 is made from a temperature-resistant and impact-proof plastic and, for example, may be produced in one step by injection molding from a plastic component, so that heating device 1 is able to be manufactured in a cost-effective manner.

Figure 2:
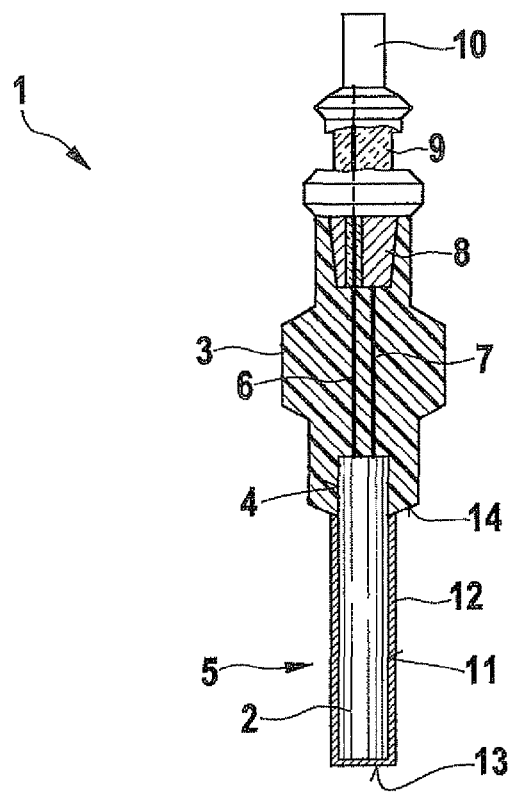
FIG. 2 shows a heating device according to a second exemplary embodiment of the present invention, in a schematic sectional view.

FIG. 2 shows a heating device 1 in a schematic representation according to a second exemplary embodiment of the present invention. In this exemplary embodiment, outer surface 11 of heating element 2 of heating device 1 is coated with a coating layer 12 at least in heating region 5. Protective layer 12 extends from a tip 13 of heating element 2 to a sealing cone 14, which is formed on housing component 3. Protective layer 12 may be applied on heating element 2 retroactively, e.g., by dipping or painting. In an advantageous manner, protective layer 12 is made of a media-resistant, in particular fuel-resistant, protective varnish, which exhibits especially satisfactory thermal conductivity through the admixture of suitable solid pigments. Boron nitride, graphite and/or silicon carbide are suitable as solid pigments. An epoxy resin filled with boron nitride or a silicon adhesive may be used to form protective layer 12, for instance.

Figure 3:
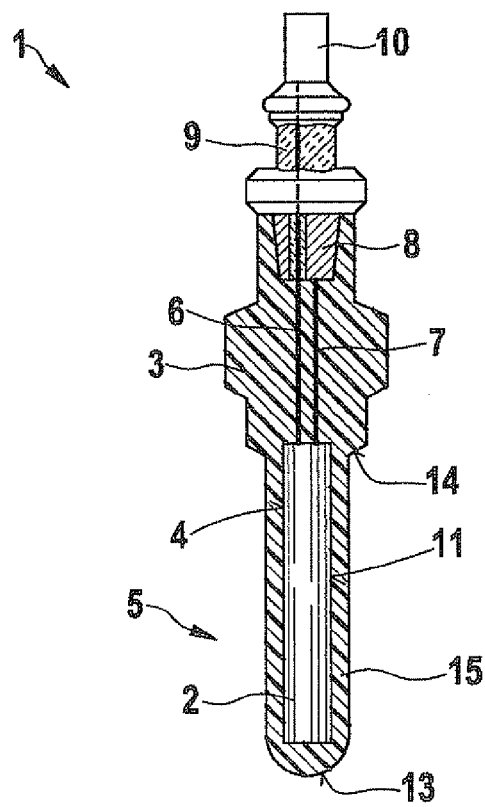
FIG. 3 shows a heating device according to a third exemplary embodiment of the present invention, in a schematic sectional view.

FIG. 3 shows a heating device 1 in a schematic representation according to a third exemplary embodiment of the present invention. In this exemplary embodiment self-regulating heating element 2 is completely surrounded by housing component 3. Depending on the development of heating element 2, the maximum temperature of heating element 2 at outer surface 11 is restricted to a particular value, so that thermal damage to housing component 3 is able to be prevented via a suitable material selection. In particular, heating region 5 of self-regulating heating element 2 is surrounded by a jacket 15 of housing component 3, which extends from tip 13 to sealing cone 14, thermal damage to jacket 15 being prevented. Housing component 3 having jacket 15 therefore encloses both heating region 5 as well as contacting region 4 of heating element 2. A temperature-resistant, impact-proof plastic having excellent heat conduction or a suitable composite are especially suitable materials for housing component 3. Injection molding in one step using a plastic component allows a cost-effective production of housing component 3.

Figure 4:
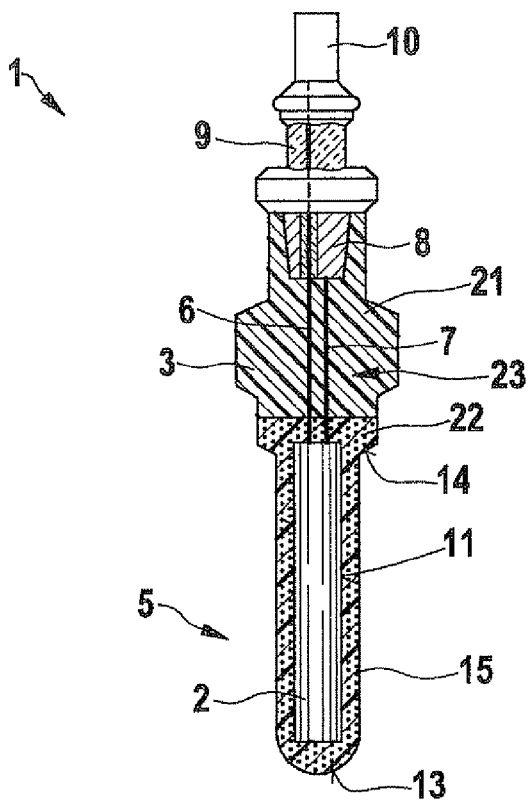
FIG. 4 shows a heating device according to a fourth exemplary embodiment of the present invention, in a schematic sectional view.

Depending on the application, an additive may be introduced into the material of housing component 3, especially into jacket 15, in order to improve the thermal conductivity. FIG. 4 shows a heating device 1 in a schematic sectional representation according to a fourth exemplary embodiment of the present invention. In this exemplary embodiment, housing component 3 is made up of a first plastic component 21 and a second plastic component 22. In a region 23, first plastic component 21 sectionally encloses electric lines 6, 7, which are routed through housing component 3 to heating element 2. Second plastic component 22 surrounds at least a heating region 5 of heating element 2; in the exemplary development shown, heating element 2 is completely enclosed by second plastic component 22. Second plastic component 22 is made from a heat-conducting, fuel-resistant material. The second plastic component includes a heat-conducting filler material, which improves the thermal conductivity from self-regulating heating element 2 through second plastic component 22 to the surrounding medium.

Forming housing component 3 from two or more plastic components 21, 22 not only makes it possible to use a cost-effective standard material but also to use a special material having excellent thermal conductivity, which results in a relatively inexpensive production with an optimized heating power.

Figure 5:
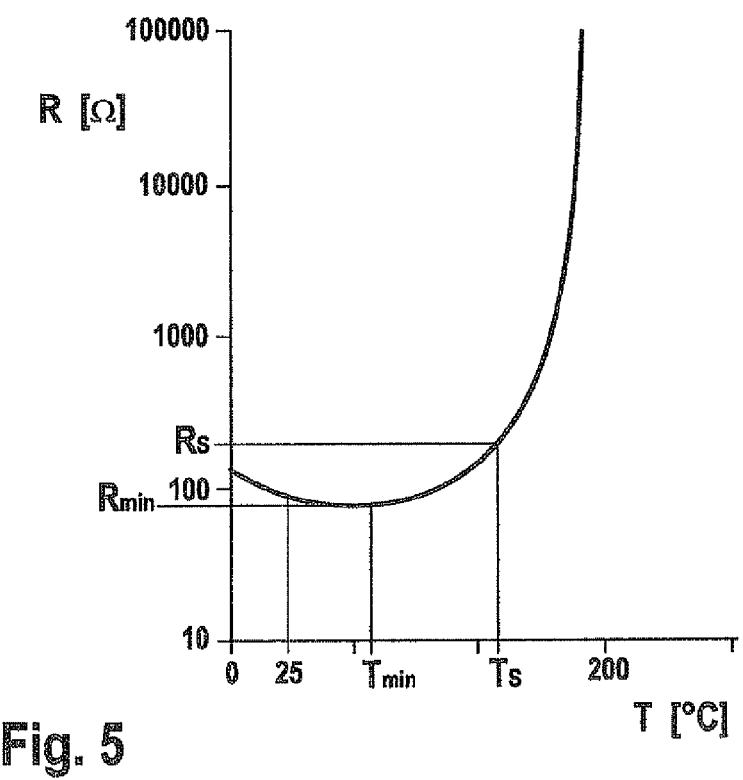
FIG. 5 shows a characteristics curve of a self-regulating heating element of a heating device to elucidate the present invention.

FIG. 5 shows a characteristics curve of a self-regulating heating element 2 in a diagram in order to elucidate the present invention. A resistance R, in Ohm, has been plotted on the ordinate versus temperature T, in degrees Celsius, on the abscissa. A logarithmic representation has been selected with regard to resistance R plotted on the ordinate. Self-regulating heating element 2 may be designed as PTC thermistor, a positive temperature coefficient of the resistor resulting in the decisive temperature range. For example, heating element 2 may be produced on the basis of a barium titanate.

As a self-regulating heating element 2, a largely voltage-independent adjustment to a switching temperature $T_S$ is able to take place. Starting from temperature $T_{min}$ at which a resistance $R_{min}$ results, resistance R rises continuously as temperature T increases; in the exemplary embodiment shown, a temperature of 200° C. must not be exceeded because of the considerably rising resistance R. At switching temperature $T_S$, a resistance $R_S$ comes about, which in conjunction with the selected voltage defines the heating power of heating element 2. This makes it possible to select a suitable heating element 2 as a function of the particular application case, in which, for one, a desired heating of the surrounding medium is achieved by the output heating power and, for another, a temperature restriction to under 200° C., for example, is ensured. Specifically, by choosing a suitable self-regulating heating element 2, switching temperature $T_S$ may be selected within a range from 120° C. to 300° C.; when heating fuels, a heating element 2 having a switching temperature of between approximately 170° C. and 210° C. may be selected.

The geometric design of heating element 2 may be defined by a cylindrical, elliptical or block-shaped body contacted on one side. However, other developments for the design of heating element 2 are possible as well, for instance a plurality of disk-shaped heating elements layered in the form of a stack and connected in series.

Housing component 3 may be made from a polyamide that is temperature-resistant up to more than 260° C. For second plastic component 22, in particular, a material having improved conductivity may be used, such as, for example, E3603 polyamide 4.6 (PA4.6) having a thermal conductivity of 18 W/mk; E5101 polyphenylene sulfide (PPS) having a thermal conductivity of 20 W/mk, which is temperature-resistant up to 260° C.; or a fluorpolymer such as PTFE or PVDF, which have even higher use limitations.

It is also possible to add additional filler materials, up to the processing limit, when processing and molding a composite for heating region 5, especially second plastic component 22. Fine-particle-sized powders of metal, e.g., copper or aluminum, or other materials having excellent thermal conductivity, e.g., graphite, silicon carbide and boron nitride, which improve the thermal conductivity, are conceivable. In addition, the heat dissipation may be optimized via the composite surface, by thin wall thicknesses or by an enlargement of the surface by patterning.

Figure 6:
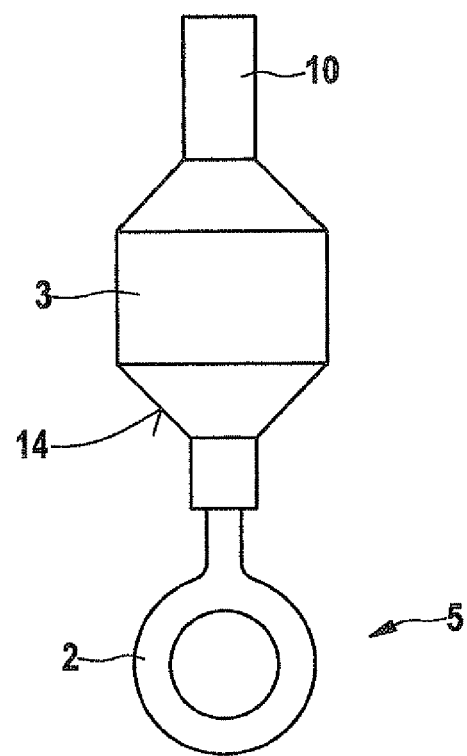
FIG. 6 shows a heating device according to a fifth exemplary embodiment of the present invention, in a schematic sectional view.

FIG. 6 shows a heating device 1 in a schematic illustration according to a fifth exemplary embodiment. In this exemplary embodiment, self-regulating heating element 2 is designed as annular disk or perforated disk in heating region 5. This advantageously allows fuel to flow around heating element 2, for instance in a fuel line.

Figure 7:
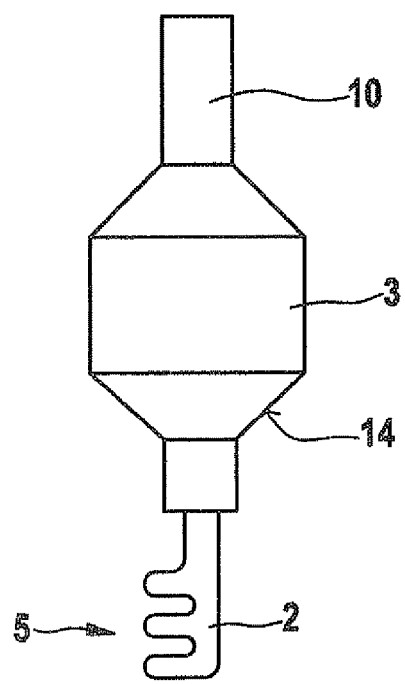
FIG. 7 shows a heating device according to a sixth exemplary embodiment of the present invention, in a schematic sectional view.

FIG. 7 shows a heating device 1 in a schematic representation according to a sixth exemplary embodiment of the present invention. In this exemplary embodiment, heating element 2 is in the form of a key, thereby resulting in an enlarged surface in this case as well.

Figure 8:
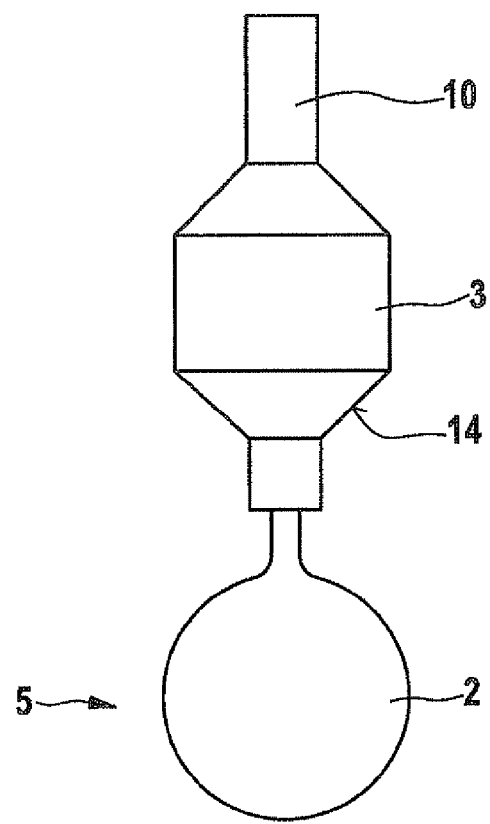
FIG. 8 shows a heating device according to a seventh exemplary embodiment of the present invention, in a schematic sectional view.

FIG. 8 shows a heating device 1 in a schematic illustration according to a seventh exemplary embodiment. In this exemplary embodiment, self-regulating heating element 2 is in the form of a disk, so that improved heat dissipation to the surrounding medium is able to be achieved.

For the exemplary embodiments shown with the aid of FIG. 6 through 8, a measure described by FIG. 2 through 4 may be provided in addition.

Figure 9:
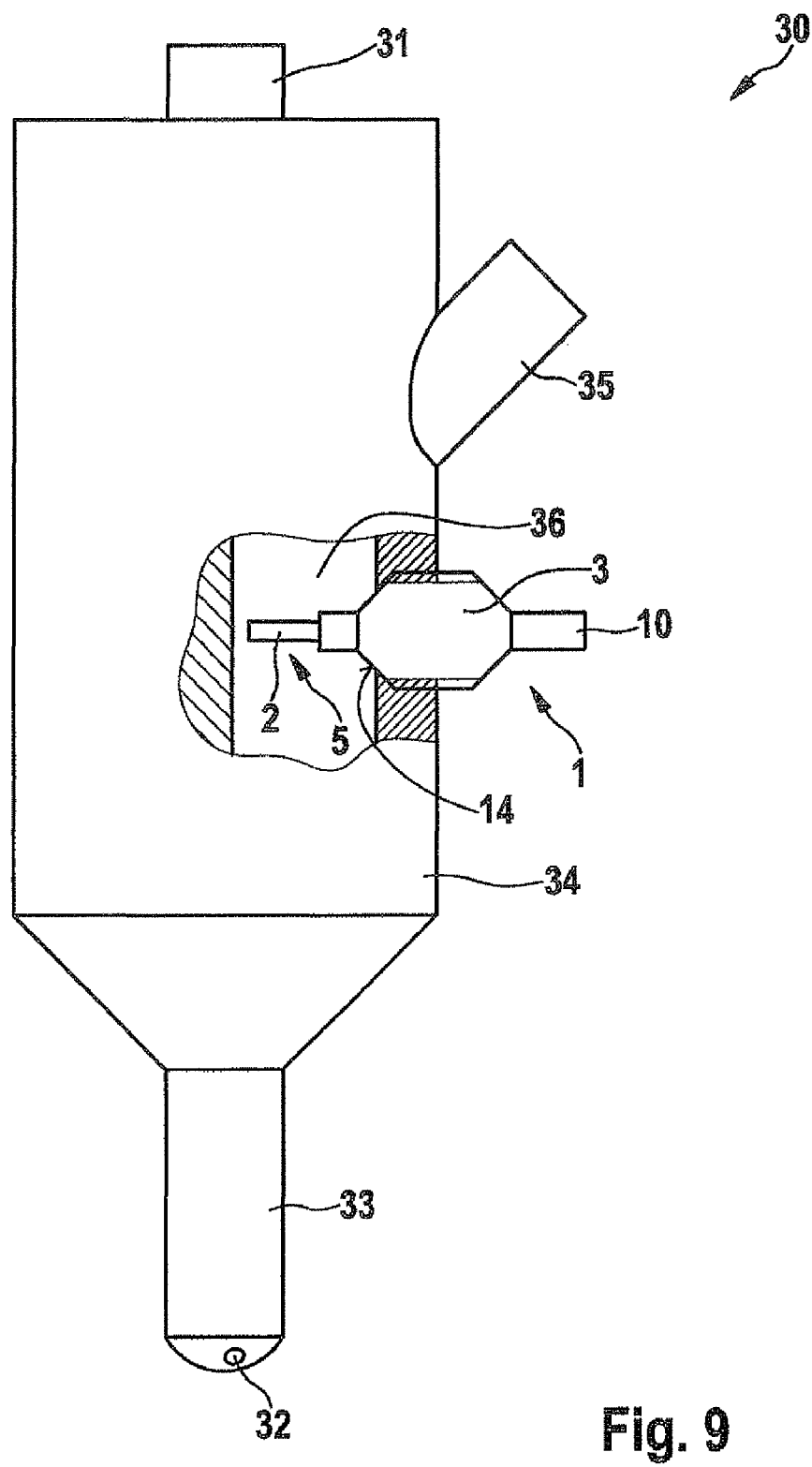
FIG. 9 shows a component, designed as fuel injector, of a fuel-injection system having a heating device according to an exemplary embodiment of the present invention.

FIG. 9 shows a component of a fuel-injection system according to one exemplary embodiment of the present invention, which component is designed as fuel injector 30. Fuel injector 30 has an electrical connection 31, with whose aid fuel injector 30 is connectable to a control device by electric lines, in order to control the spray-discharge of fuel via at least one nozzle opening 32 in a nozzle body 33. Furthermore, fuel injector 30 has a valve housing 34 connected to nozzle body 33, a fuel intake nipple 35 being provided on valve housing 34. Using fuel intake nipple 35, fuel is able to be supplied into valve housing 34, the fuel being routed to nozzle opening 32 through valve housing 34 and nozzle body 33. FIG. 9 shows a simplified illustration of a partially open fuel injector 30, which illustration shows a fuel chamber 36 within valve housing 34. Fuel chamber 36 may also be formed by a fuel channel. Heating device 1 is partially screwed into valve housing 34, and sealing from valve housing 34 takes place at sealing cone 14 of housing 3. Thus, heating element 2 is situated inside fuel chamber 36, so that fuel flowing past heating region 5 of heating element 2 is preheated.

It must be noted that the use of heating device 1 in a fuel injector 30 as it is shown in FIG. 9 is one potential use. Additional application possibilities exist also in thermo technology or safety engineering; a compact heating device 1 which is protected against overheating may be utilized to protect sensitive devices used on the outside, e.g., pumps, actuator motors or cameras, from the cold.

The exemplary embodiments and/or exemplary methods of the present invention is not limited to the exemplary embodiments described.

What is claimed is:

1. A heating device, which is a heater for liquid fuels, comprising:
   at least one housing component; and
   a heating element at least partially embedded in the housing component, which is a self-regulating heating element;
   wherein the self-regulating heating element is enclosed by the housing component, the housing component being made of one of a heat-conducting plastic and a composite.

2. The heating device of claim 1, wherein the housing component is made up of a first plastic component and at least one second plastic component, wherein the first plastic component at least sectionally surrounds electric lines for contacting the heating element, and wherein the second plastic component surrounds a heating region of the heating element, and the second plastic component is formed from a heat-conducting, fuel-resistant material.

3. The heating device of claim 2, wherein the second plastic component has at least one heat-conducting filler material.

4. The heating device of claim 3, wherein the filler material is at least essentially formed by at least one of a metal powder, graphite, silicon carbide and a boron nitride.

5. The heating device of claim 1, wherein the heating element has at least one heating region, and the heating region is designed in the form of one of a pin, a disk, a perforated disk, a ring and a key.

6. A fuel injector for an air-compressing, self-igniting internal combustion engine, comprising:
   a fuel intake nipple;
   a nozzle body, from which a fuel is able to be spray-discharged;
   a heating device to preheat a fuel carried from the fuel-intake nipple to the nozzle body, wherein the heating device, which is a heater for a liquid fuel, includes at least one housing component, and a heating element at least partially embedded in the housing component, which is a self-regulating heating element;
   wherein the self-regulating heating element is enclosed by the housing component, the housing component being made of one of a heat-conducting plastic and a composite.

7. A component of a fuel-injection system, comprising:
   a fuel chamber, which is at least partially filled with a fuel during operation; and
   a heating device to preheat the fuel provided in the fuel chamber;
   wherein the heating device, which is a heater for a liquid fuel, includes at least one housing component, and a heating element at least partially embedded in the housing component, which is a self-regulating heating element;
   wherein the self-regulating heating element is enclosed by the housing component, the housing component being made of one of a heat-conducting plastic and a composite.

* * * * *